United States Patent
Logiudice

(10) Patent No.: US 8,040,647 B2
(45) Date of Patent: Oct. 18, 2011

(54) SYSTEM AND METHOD FOR PROTECTION AGAINST LOSS OF BATTERY IN REVERSE BATTERY PROTECTED DEVICES

(75) Inventor: Andrea Logiudice, Padua (IT)

(73) Assignee: Infineon Technologies Austria AG, Villach (AT)

( * ) Notice: Subject to any disclaimer, the term of this patent is extended or adjusted under 35 U.S.C. 154(b) by 534 days.

(21) Appl. No.: 12/268,599

(22) Filed: Nov. 11, 2008

(65) Prior Publication Data

US 2010/0118459 A1    May 13, 2010

(51) Int. Cl.
    *H02H 3/00* (2006.01)
(52) U.S. Cl. .................................................. 361/84
(58) Field of Classification Search ............ 361/84
    See application file for complete search history.

(56) References Cited

U.S. PATENT DOCUMENTS

| | | | | |
|---|---|---|---|---|
| 4,303,958 | A * | 12/1981 | Allgood | 361/100 |
| 5,608,259 | A * | 3/1997 | DeShazo et al. | 257/547 |
| 6,107,844 | A * | 8/2000 | Berg et al. | 327/110 |

* cited by examiner

*Primary Examiner* — Stephen W Jackson
(74) *Attorney, Agent, or Firm* — Slater & Matsil, L.L.P.

(57) ABSTRACT

A system and method for protecting a reverse battery protected device during loss of battery are disclosed. An embodiment method includes biasing a substrate of a substrate switch of the reverse battery protected device to a lowest potential selected between a battery voltage and ground when the battery voltage is less than a magnitude of a first substrate clamping voltage during reverse battery, clamping the substrate to the first substrate clamping voltage when the battery voltage is greater than the magnitude of the first substrate clamping voltage during reverse battery, and clamping the substrate to a second substrate clamping voltage during loss of battery, where a magnitude of the second substrate clamping voltage is less than the magnitude of the first substrate clamping voltage.

25 Claims, 4 Drawing Sheets

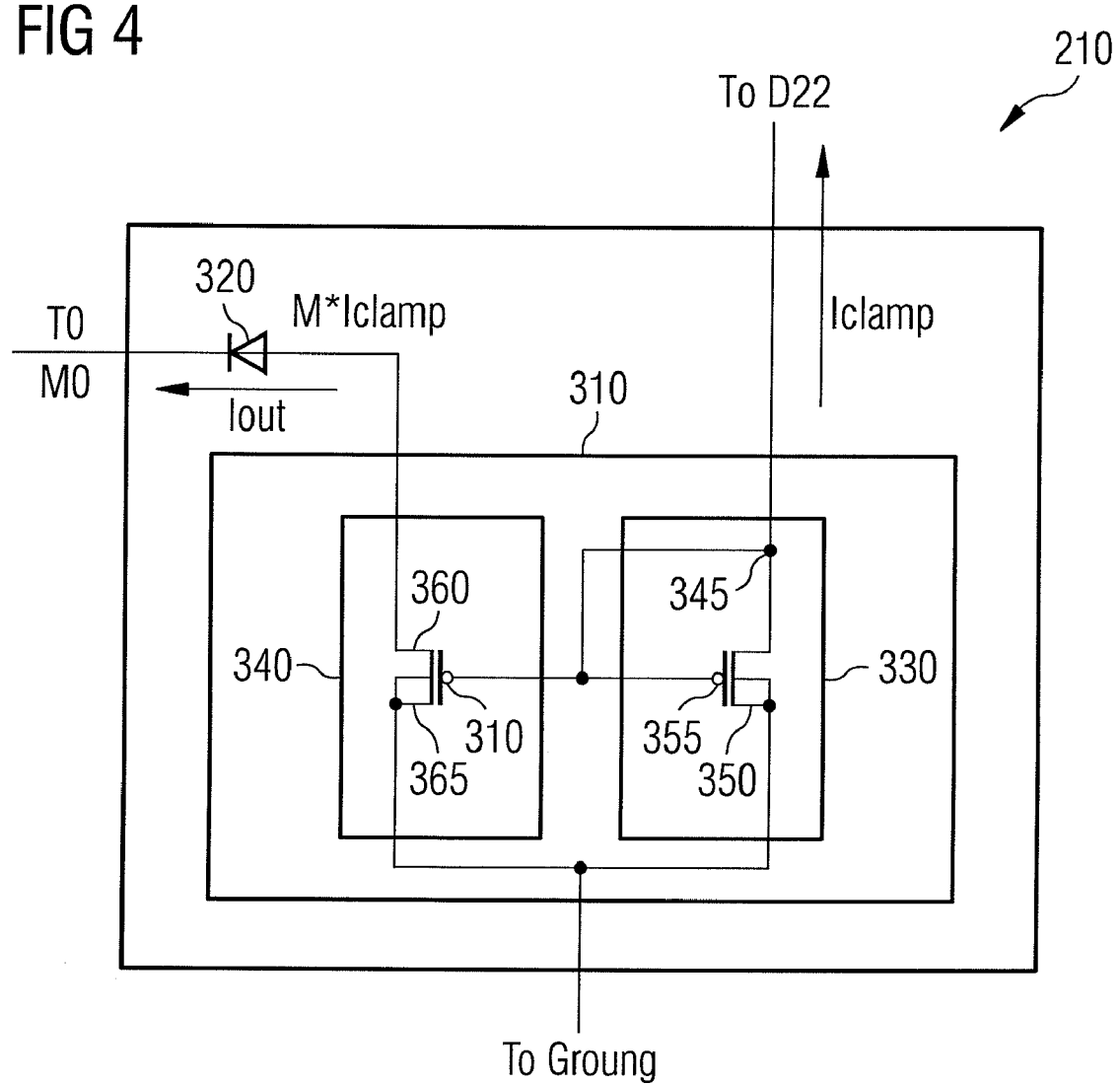

SYSTEM AND METHOD FOR PROTECTION AGAINST LOSS OF BATTERY IN REVERSE BATTERY PROTECTED DEVICES

TECHNICAL FIELD

Certain embodiments of the invention relate to protecting a reverse battery protected device against loss of battery. More specifically, certain embodiments of the invention relate to protecting a reverse battery protected device against loss of battery based upon clamping events initiated by the loss of battery.

BACKGROUND

Battery powered devices are susceptible to the consequences of batteries being installed in reverse polarity, as well as other types of careless use. In many situations, configuration of a device with a battery installed backwards can be catastrophic, resulting in destruction of the device itself, electrical components that support the device, or other electrical circuits that share circuit boards or common substrates, for example. Mechanical and electrical safeguards have been designed to protect battery operated devices when a user inadvertently installs a battery with the leads reversed.

Some reverse battery protected devices are also susceptible to loss of battery. Loss of a battery can be due to a sudden catastrophic failure in the battery itself, or to a break in a battery lead or a conductor that couples the battery to the reverse battery protected device. Devices that have inductive components, such as switched inductive loads, are particularly vulnerable to the effects of loss of DC source power. Since voltages across inductive components depend upon the rate of change of current in the component, devices having inductive components typically generate excessively large voltages upon loss of power. These large voltages in combination with the discharge of electromagnetic energy stored in the inductive components can exceed device and circuit design specifications, resulting in catastrophic failure in the device and/or associated electrical components and circuitry.

Some reverse battery protected devices utilize external circuits that provide alternate current pathways for dissipation of power during loss of battery. Other reverse battery protected devices implement design changes to those circuits and associated device components that are most affected by the consequences of loss of DC source voltage. These design changes allow the affected components to handle large amounts of power dissipation under loss of battery. However, these techniques are typically costly to implement as they involve additional external protection circuits or nonefficient redesign and resizing of affected components. In addition, these techniques typically do not shift power dissipation from vulnerable electrical components to power components, such as power switches for example, that are designed to accommodate high power.

SUMMARY OF THE INVENTION

In an embodiment of the invention, a method for protecting a reverse battery protected device under loss of power comprises biasing, when the device is under reverse polarity, a substrate of a substrate switch of the reverse battery protected device at a negative voltage −Vs, where the voltage Vs of the voltage source is less than an absolute value of a first substrate clamping voltage of the substrate switch so that the substrate switch is non-conducting under reverse polarity. The method further comprises clamping, under loss of power, the substrate of the substrate switch to a second substrate clamping voltage, where an absolute value of the second substrate clamping voltage is less than the absolute value of the first substrate clamping voltage for distributing power.

In one embodiment, the reverse battery protected device comprises a switched inductive load, a substrate switch coupled in parallel with the switched inductive load and a voltage source coupled in parallel with the substrate switch. In one embodiment, the substrate switch includes a semiconductor substrate. In yet another embodiment, the switched inductive load comprises a power switch coupled in series with an inductive load.

In an embodiment, a method for protecting a reverse battery protected device under loss of power comprises clamping a semiconductor substrate of the power switch to a third substrate clamping voltage for controlling power in the power switch. In another embodiment, clamping the substrate of the power switch to the third substrate clamping voltage triggers clamping the substrate of the substrate switch to the second substrate clamping voltage.

In another embodiment, a method for protecting a reverse battery protected device under loss of battery comprises selecting, during load switching and reverse battery polarity, the most negative potential between ground and a voltage at a positive connector terminal to bias a substrate of a substrate switch such that the substrate switch is non-conducting during reverse battery polarity, where the absolute value of a first substrate clamping voltage of the substrate switch is greater than a predefined maximum battery voltage. The method further comprises clamping, during loss of a battery, the substrate of the substrate switch to a second substrate clamping voltage, where an absolute value of the second substrate clamping voltage is less than the absolute value of the first substrate clamping voltage for distributing power between the substrate switch and a power switch. In one embodiment, the positive connector terminal is coupled to either a positive or a negative terminal of the battery.

In another embodiment, a circuit protection system for use with an inductive load and a DC voltage source comprises a substrate switch having a semiconductor substrate, a first clamping device coupled to the substrate switch, and a substrate voltage adjustment device coupled to the substrate switch. In one embodiment, the substrate switch includes a first node coupled to a first terminal of the DC voltage source and the inductive load and a second node coupled to a second terminal of the DC voltage source. In one embodiment, the substrate switch is configured to bias the substrate to the most negative voltage selected between ground and a voltage at the first node during inductive load switching and reverse polarity.

In another embodiment, the first clamping device is configured to clamp the substrate at a first substrate clamping voltage during reverse polarity when the negative battery voltage at the first node is more negative than the first substrate clamping voltage. In yet another embodiment, the substrate voltage adjustment device is configured to clamp the substrate at a second substrate clamping voltage that is less negative than the first substrate clamping voltage during a decoupling of the first node from the first terminal of the DC voltage source or a decoupling of the second node from the second terminal of the DC voltage source.

These and other advantages, aspects and novel features of the present invention, as well as details of an illustrated embodiment thereof, will be more fully understood from the following description and drawings.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates the substrate voltage adjustment device of FIG. 3, according to an embodiment of the invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
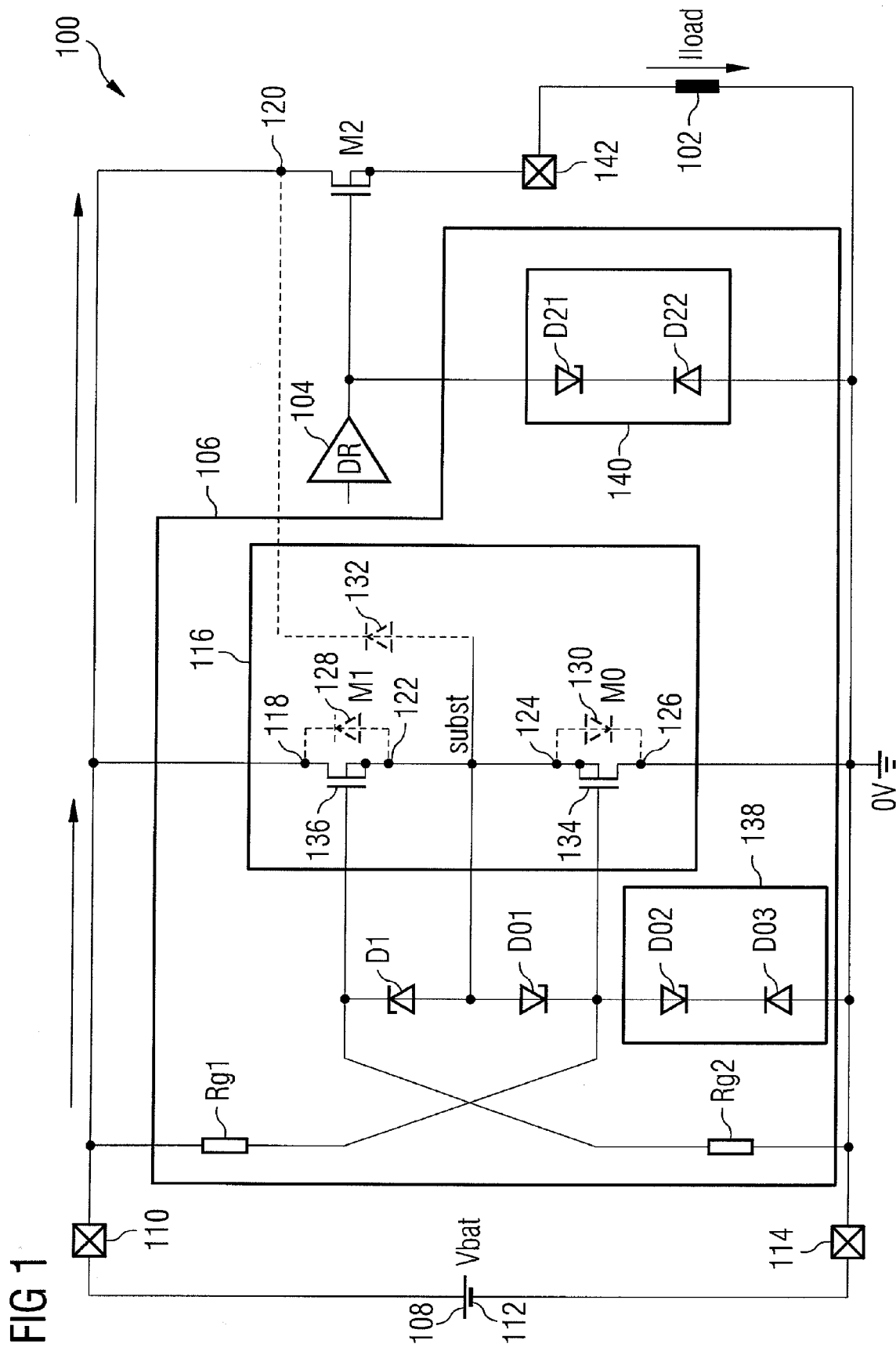
FIG. 1 is a schematic diagram of a conventional reverse battery protected device operating under load switching.

FIG. 1 is a schematic diagram of a conventional reverse battery protected device 100 operating under load switching. The conventional reverse battery protected device 100 includes an inductive load 102, a power transistor switch M2, a power transistor switch driver 104, a DC voltage source Vbat, and reverse battery protection circuit 106. A positive terminal 108 of Vbat is coupled to a positive connector terminal 110 and a negative terminal 112 of Vbat is coupled to a negative connector terminal 114. As illustrated, the conventional reverse battery protected device 100 is configured in load switching mode under which, for example, an inductive load may be coupled to Vbat for electromagnetic charging. The power transistor switch M2 may be a power MOSFET switch. The power transistor switch driver 104 drives the power MOSFET switch M2, enabling the DC voltage source Vbat to charge the inductive load 102.

Although not illustrated, when the positive terminal 108 of Vbat is coupled to the negative connector terminal 114 and the negative terminal 112 of Vbat is coupled to the positive connector terminal 110, the conventional reverse battery protected device 100 is configured in reverse polarity (also referred to as reverse battery). Typically, a user inadvertently couples the terminals 108 and 112 of the DC voltage source Vbat to the connector terminals 110 and 114 with the polarity reversed.

The reverse battery protection circuit 106 includes a substrate switch 116 configured to avoid parasitic substrate current flow and operating voltages that exceed design specifications under reverse battery (i.e., reverse polarity) operating conditions. The substrate switch 116 includes a first transistor switch M1 and a second transistor switch M0. As illustrated, the two transistor switches M1 and M0 are MOSFET switches coupled in series. The positive connector terminal 110 is coupled to a drain 118 of the first transistor switch M1 and a drain 120 of the power transistor switch M2, a source 122 of the first transistor switch M1 is coupled to a source 124 of the second transistor switch M0, and a drain 126 of the second transistor switch M0 is coupled to ground.

As illustrated, each MOSFET switch M1 and M0 is an n-channel, common-source configured MOSFET device (i.e., device substrate electrically coupled to source). Each MOSFET switch M1 and M0 and power MOSFET switch M2 has parasitic p-n junctions (depicted as parasitic diodes 128, 130 and 132, respectively) that may allow large parasitic currents to flow from substrate to drain whenever the parasitic p-n junctions are forward biased. A gate 134 of the second transistor switch M0 is coupled to the positive connector terminal 110 via a first resistor Rg1 and a gate 136 of the first transistor switch M1 is coupled to ground via a second resistor Rg2.

In operation, the substrate switch 116 selects the lowest potential between ground and a voltage at the positive connector terminal 110 to bias the substrate of the switches. For example, when the conventional device 100 is under load switching with a 12V battery (i.e., positive connector terminal 110 coupled to positive battery terminal 108 as illustrated), the voltage at the positive connector terminal 110 is 12 volts, second transistor switch M0 is on (i.e., in a conducting state), and first transistor switch M1 is off (i.e., in a non-conducting state). Since first transistor switch M1 is off, and since the parasitic diode 128 of first transistor switch M1 is reverse biased, zero current flows in the substrate switch 116. Consequently, the drain-source voltage of second transistor switch M0 is zero and thus the substrate is biased at ground (i.e., zero volts). In effect, the substrate switch 116 selects the lowest potential (i.e., the most negative potential) between 12V and ground to bias the substrate.

However, when the polarity of the 12V battery is reversed (not illustrated) with respect to the connector terminals 110 and 114, the voltage at the positive connector terminal 110 is negative 12V. Consequently, second transistor switch M0 is turned off. Furthermore, the parasitic diode 130 associated with second transistor switch M0 is reverse biased, and thus zero current flows in the substrate switch 116. In addition, first transistor switch M1 is on (i.e., in a conducting state). Since zero current flows in the substrate switch 116, the drain-source voltage of the first transistor switch M1 is zero, the associated parasitic diode 128 is not forward biased, and consequently the substrate is biased at −12V. In effect, the substrate switch 116 selects the lowest potential (i.e., the most negative potential) between −12V and ground to bias the substrate. During reverse polarity, the substrate switch 116 is turned off (i.e., the substrate switch 116 is in a non-conducting state).

As illustrated, first and second resistors Rg1 and Rg2 and the DC voltage source Vbat bias the gates 134 and 136 of second and first MOSFET switches M0 and M1, respectively. Zener diodes D1 and D01 limit the gate-source voltages of first and second MOSFET switches M1 and M0 to values within design specification ranges. In effect, Zener diodes D1 and D01 protect the first and second MOSFET switches M1 and M0 from excessively large gate voltages, in absolute value.

The reverse battery protection circuit 106 may include dedicated first and second clamping devices 138 and 140, respectively. As discussed in more detail below in conjunction with FIG. 2, the first and second clamping devices 138 and 140 are adapted to limit power dissipation in the conventional device 100 during loss of the DC voltage source Vbat during inductive load switching.

Figure 2:
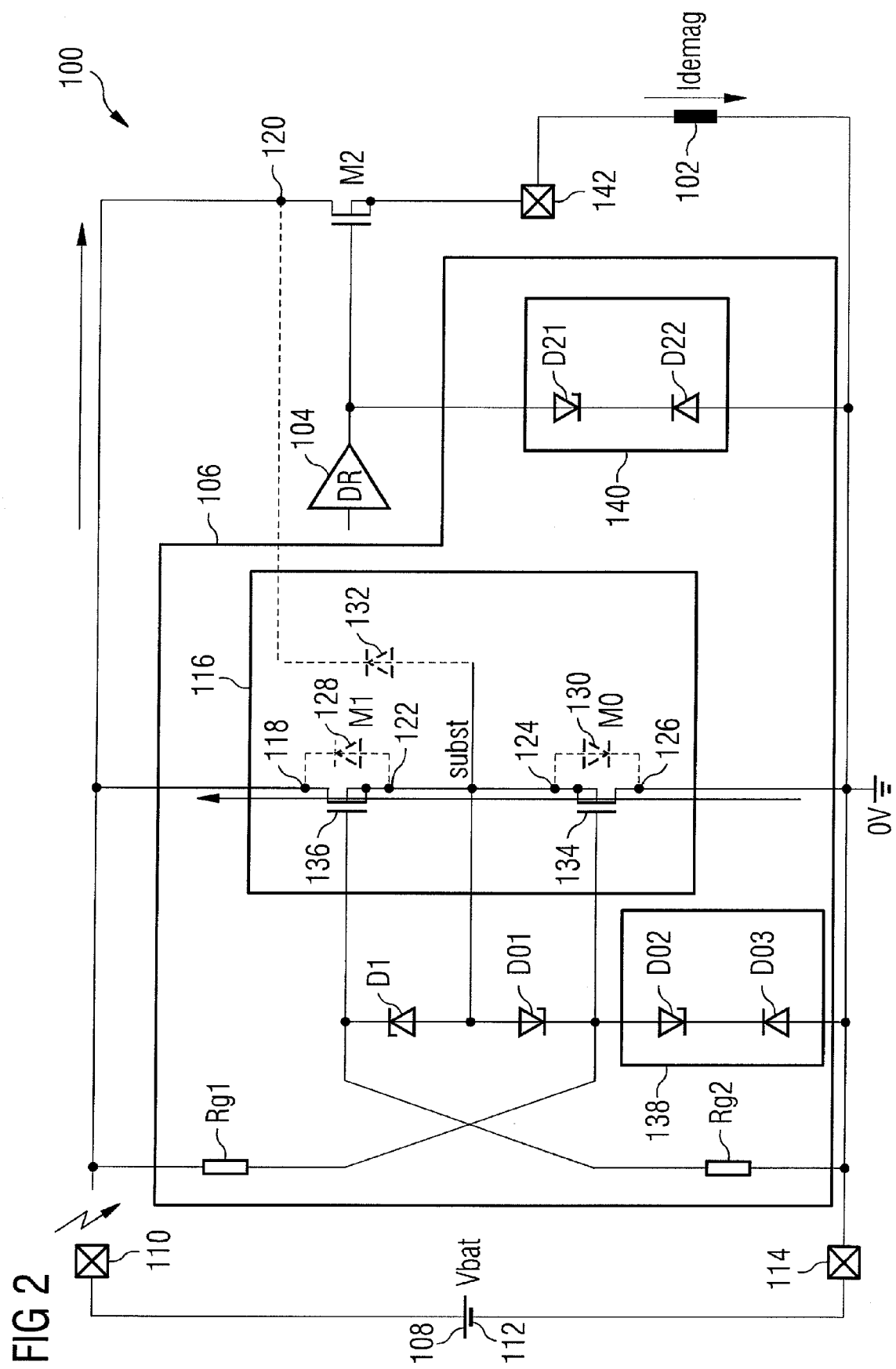
FIG. 2 is a schematic diagram of the conventional reverse battery protected device illustrated in FIG. 1 operating under loss of DC voltage source.

FIG. 2 is a schematic diagram of the conventional reverse battery protected device 100 illustrated in FIG. 1 operating under loss of the DC voltage source. As represented by the lightning bolt, the DC voltage source Vbat is electrically disconnected from the inductive load 102 during inductive load switching. Upon loss of Vbat, the electromagnetic energy stored in the inductive load 102 is discharged via a demagnetization current $I_{demag}$ that flows in the substrate switch 116 and the power transistor switch M2. Without the first dedicated clamping device 138 as illustrated, the absolute value of the voltage at the drain 118 of the first transistor switch M1 and at the drain 120 of the power transistor switch M2 would be very large (i.e., the voltage would ideally be negative infinity) at the instant the DC voltage source Vbat is disconnected from the inductive load 102. The instantaneous power dissipated in the substrate switch 116 would be enormous, greatly exceeding design specifications and consequently destroying the substrate switch 116.

When the DC voltage source Vbat is lost (e.g., either the voltage source generates zero voltage or the voltage source is physically decoupled from the load 102 by an electrical break at the positive and/or negative connector terminals 110 and 114, for example) during inductive load switching, the first clamping device 138 limits the voltage drop across the substrate switch 116 (and thus the power dissipated in the substrate switch 116) by clamping the substrate of the substrate switch 116 to a first substrate clamping voltage. As will be discussed further below, clamping the substrate to a substrate clamping voltage during loss of the DC voltage source Vbat effectively clamps the voltage of the drain 118 of the first transistor switch M1. In addition, the second clamping device 140 clamps a substrate 142 of power transistor switch M2 to a second substrate clamping voltage, thereby constraining the drain, source and gate voltages of power transistor switch M2 to be within design specifications and limiting the amount of power dissipated in power transistor M2 during loss of the DC voltage source Vbat during inductive load switching.

As illustrated, the first clamping device 138 includes a Zener diode D02 coupled in series with a diode D03 and the second clamping device 140 includes a Zener diode D21 coupled in series with a diode D22. For example, Zener diode D02 may have a reverse bias operating voltage of −20V and Zener diode D21 may have a reverse bias operating voltage of −25V. In operation, at the instant the DC voltage source Vbat is disconnected during inductive load switching, the first clamping device 138 clamps the voltage on the gate 134 of second transistor switch M0 at approximately −21V (i.e., an approximate 0.7V drop across D03 and 20 volt drop across D02). Since a non-zero demagnetization current $I_{demag}$ flows in the substrate switch 116, both first and second transistor switches M1 and M0 are on (i.e., in conducting states). Consequently, the voltage on the substrate is clamped at −26 V (given a 5V gate-source voltage in a conducting n-channel MOSFET switch). Therefore, the voltage at the drains 118 and 120 of first transistor switch M1 and power transistor switch M2, respectively, is approximately −27V given a drain-source voltage of approximately −1V in a conducting n-channel MOSFET switch. The second clamping device 140 clamps the gate voltage of power transistor switch M2 to approximately −26V. Consequently, the source/substrate 142 of power transistor switch M2 is clamped at −31V, given a 5V gate-source voltage.

In order to ensure that the substrate switch 116 is off when the DC voltage source Vbat is connected in reverse polarity, the absolute value of the substrate clamping voltage of the substrate switch 116 must be greater than the voltage of the DC voltage source. For example, with reference to FIG. 1, assume that the DC voltage source is supplied by a 30V battery coupled in reverse polarity (not shown), and assume that Zener diode D02 has a reverse bias operating voltage of −20V. Due to the first dedicated clamping structure 138, the voltage on the gate of second transistor switch M0 is −21V and second transistor switch M0 is turned on. Since the gate-source voltage of second transistor switch M0 is approximately 5V, the substrate of the substrate switch 116 is clamped at a voltage of approximately −26V. However, first transistor switch M1 is also turned on, with a gate-source voltage of approximately 26V and a drain-source voltage of approximately −4V. Thus, the substrate switch 116 is turned on. In order to ensure that the switch 116 will not turn on during reverse polarity, the absolute value of the substrate clamping voltage of substrate switch 116 must be greater than the DC voltage.

However, ensuring that the substrate switch 116 is off under reverse polarity to enable reverse battery protection means that the substrate switch 116 has high power dissipation during loss of battery during load switching. For example, again with reference to FIG. 1, assume that the DC voltage source is a 25V battery coupled to the positive and negative connector terminals 110 and 114 in reverse polarity (not shown) and assume that the Zener diode D02 has a reverse bias operating voltage of −20V. As discussed above, the substrate clamping voltage of the substrate switch 116 is −26V. In this exemplary embodiment, the substrate switch 116 remains off during reverse polarity, since the absolute value of the substrate clamping voltage (i.e., 26V) is greater than the voltage of the DC voltage source (i.e., 25V).

Referring once again to FIG. 2, when the 25V DC voltage source Vbat is decoupled from the load 102 during inductive load switching, the substrate of the substrate switch 116 is clamped at −26V and the voltage at the drain 118 of first transistor switch M1 is approximately −27V. Assuming a demagnetization current $I_{demag}$ of 1 A, the power dissipated by the substrate switch 116 is 27 Watts. More importantly, the power dissipated by the second MOSFET switch M0 is approximately 26 W. Under these conditions, second transistor switch M0 will typically be destroyed. In contrast, the power dissipated by the power transistor switch M2 is much less.

For example, assume that Zener diode D21 of second clamping structure 140 has a reverse bias operating voltage of −25V. Upon loss of the 25V battery, second clamping structure 140 clamps the gate voltage of power transistor switch M2 to approximately −26V, and clamps the substrate 142 of the power transistor switch M2 to approximately −31V (assuming a gate-source voltage of approximately 5V). In the exemplary embodiment, power transistor switch M2 dissipates approximately 4 W which is significantly less than the 26 W dissipated by second transistor switch M0.

In order to provide circuit protection against both reverse polarity and loss of a DC voltage source, some circuit designers have resized the substrate switch 116 to handle the large power dissipation triggered by loss of battery during inductive load switching. However, such solutions are not practical due to the high costs associated with implementation of a substrate switch having the same size as power transistor switch M2. In addition, the reverse battery protected device must be designed to accommodate the large amount of heat generated by the substrate switch. Other proposed solutions include adding external suppressor diode circuitry to the system. External suppressor diode circuitry typically includes Zener diodes coupled in series to provide an additional path for inductive load demagnetization current when the device experiences a loss of battery during inductive load switching. However, implementation of external suppressor diode technology is impractical due to the added costs.

Figure 3:
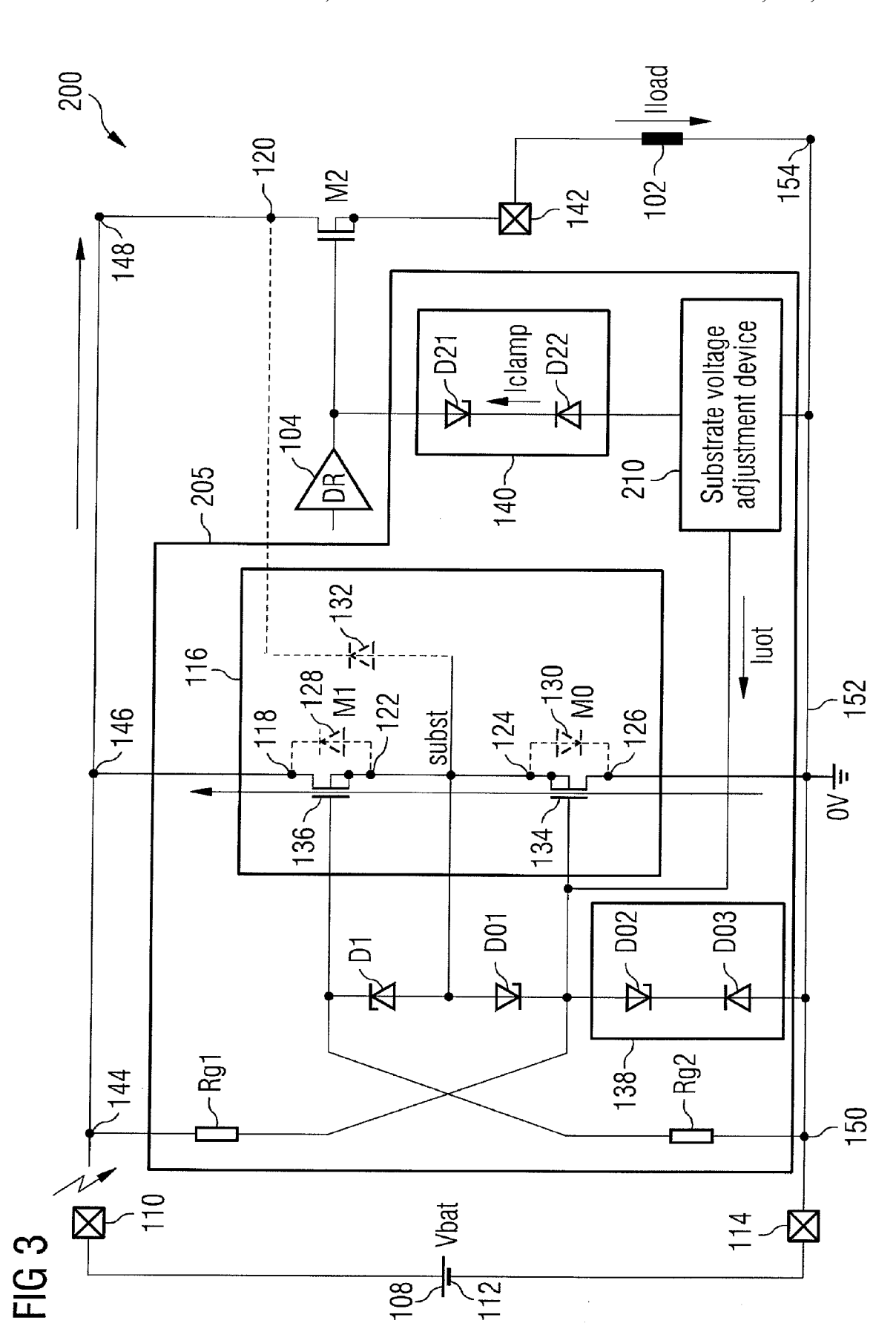
FIG. 3 is a schematic diagram of a reverse battery protected device operating under loss of a DC voltage source, according to an embodiment of the invention.

FIG. 3 is a schematic diagram of a reverse battery protected device 200 operating under loss of DC voltage source, according to an embodiment of the invention. Like reference labels in FIGS. 1 and 2 refer to substantially similar elements. However, specific device characteristics, bias voltages and operating voltages for similar elements may be different.

Device characteristics include, but are not limited to, substrate clamping voltages, reverse bias operating voltages of diodes, configuration of switches (e.g., type of switch, channel type, power ratings and parasitic values of resistance, capacitance and inductance), range of operating values for DC source voltage and type of load.

The reverse battery protected device 200 includes reverse battery/loss of battery protection unit 205. The reverse battery/loss of battery protection unit 205 includes substrate voltage adjustment device 210. The substrate voltage adjustment device 210 couples the second clamping structure 140 to substrate switch 116. In the exemplary embodiment as illustrated, substrate voltage adjustment device 210 is activated by a clamping event. In one embodiment, a loss of the DC voltage source Vbat (i.e., a decoupling of the DC voltage source Vbat from the load 102) is a clamping event that activates the second clamping device 140 to clamp the voltage of the substrate 142 of the power transistor switch M2. As illustrated, an activated second clamping device 140 draws a current $I_{clamp}$. In one embodiment of the invention, the clamping current $I_{clamp}$ activates the substrate voltage adjustment device 210 to generate a current $I_{out}$ that charges the gate 134 of second transistor switch M0. The scope of the present invention includes any adjustment device that, when triggered by a clamping event, generates output current for charging the gate 134 of second transistor switch M0. One embodiment of the substrate voltage adjustment device 210 is discussed further below in conjunction with FIG. 4.

In operation during reverse polarity, the first and second clamping devices 138 and 140 are not activated when the absolute value of the substrate clamping voltage is greater than the voltage of the DC voltage source. In one embodiment of the invention, the voltage supplied by the DC voltage source is less than or equal to a predefined maximum battery voltage. Since the clamping devices 138 and 140 are non-conducting, $I_{clamp}=0$ and the substrate voltage adjustment device 210 is not activated. Consequently the output current $I_{out}$ is zero, and the substrate voltage adjustment device 210 does not adjust the voltage on the gate 134 of the second transistor switch M0. For example, in an exemplary reverse polarity embodiment (not shown), the negative terminal 112 of a 25V DC voltage source Vbat is coupled to the positive connector terminal 110 and the positive terminal 108 of the 25V source is coupled to the negative connector terminal 114, the substrate switch 116 biases the substrate at −25V (below the substrate clamping voltage of −26V), and neither the first clamping device 138 or the second clamping device 140 is activated.

However, assume that in another exemplary embodiment (not shown) the negative terminal 112 of the 25V DC voltage source Vbat is coupled to the negative connector terminal 114 and the positive terminal 108 of the 25V source is coupled to the positive connector terminal 110. Under this exemplary embodiment, device 200 is configured in load switching mode. Now assume a loss of battery as illustrated in FIG. 3 (e.g., loss of the 25V DC voltage source). A loss of battery could occur, for example, by an electrical open in a conductor coupling the positive connector terminal 110 to one or more nodes 144, 146 or 148, an electrical open in a conductor coupling the negative connector terminal 114 to one or more nodes 150, 152 or 154, or a sudden failure of the DC voltage source Vbat.

As illustrated, at the instance of loss of battery, first and second clamping devices 138 and 140 are activated and conduct current. The clamping current $I_{clamp}$ activates the substrate voltage adjustment device 210 (i.e., turns on the device 210). The substrate voltage adjustment device 210 generates an output current $I_{out}$ that raises the voltage (i.e., makes the voltage less negative) on the gate 134, thereby raising the substrate clamping voltage and the voltage at the drain 118 of the substrate switch 116. In effect, the substrate voltage adjustment device 210 controls power dissipation between the substrate switch 116 and a switched inductive load (e.g., power transistor switch M2 coupled in series with load 102). In one embodiment, the substrate voltage adjustment device 210 lowers the magnitude of the substrate clamping voltage of the substrate switch 116 only during clamping events in order to shift power dissipation from the substrate switch 116 to the power transistor switch M2 or to the switched inductive load.

FIG. 4 illustrates the substrate voltage adjustment device 210 of FIG. 3, according to an embodiment of the invention. In the exemplary embodiment as illustrated, substrate voltage adjustment device 210 includes a MOS mirror device 310 coupled to a diode 320. In the embodiment as illustrated, MOS mirror device 310 is a PMOS mirror device, but the scope of the invention contemplates any device configured to produce an output current $I_{out}=M*I_{clamp}$ that mirrors an input current $I_{clamp}$. As illustrated, the PMOS mirror device 310 includes a first common-source configured PMOS device 330 coupled to a second common-source configured PMOS device 340. The first common-source configured PMOS device 330 has a drain 345 coupled to the second clamping device 140, a source 350 coupled to ground, and a gate 355 coupled to the drain 345. The second common-source configured PMOS mirror device 340 has a drain 360 coupled to the diode 320, a source 365 coupled to ground, and a gate 370 coupled to the gate 355 of the first common-source configured PMOS device 330.

In operation, a clamping event activates the second clamping device 140, thereby generating a clamping current $I_{clamp}$. The clamping current $I_{clamp}$ activates (i.e., turns on) the first and second PMOS devices 330 and 340. Since the voltage at the gate 134 of M0 is initially less than −0.7 V due to clamping by the first clamping device 138, diode 320 is forward biased and an output current $I_{out}=M*I_{clamp}$ flows to the gate 134 of M0, effectively raising the voltage on the gate 134. The output current forces the voltage on the gate 134 to rise to approximately −0.7 V. The gate voltage effectively clamps the substrate of the substrate switch 116 to approximately −6V and drain 118 of first transistor switch M1 to approximately −7V. For a demagnetization current $I_{demag}$ of 1 A, the power dissipated by the substrate switch 116 is approximately 7 Watts. The power dissipated by the first transistor switch M1 is approximately 1 W and the power dissipated by the second transistor switch M0 is approximately 6 Watts (as compared to a power dissipation of 26 W by the second transistor switch M0 without the substrate voltage adjustment device 210). The power dissipated by power transistor switch M2 is about 24 Watts (as compared to a power dissipation of 4 W by the power transistor switch M2 without the substrate voltage adjustment device 210).

According to the exemplary embodiment discussed above, at the initiation of a clamping event due to loss of battery, the substrate voltage adjustment device 210 reduces power dissipation in second transistor switch M0 by about a factor of four and increases power dissipation in power transistor switch M2 by about a factor of four as compared to power dissipation in the switches due to loss of battery without the substrate voltage adjustment device 210. In effect, the substrate voltage adjustment device 210 shifts power dissipation from the substrate switch 116 to the power transistor switch M2 during loss of battery, thereby keeping the substrate switch 116 within power, current and voltage design specifications. Power transistor switches are typically designed to handle a higher power dissipation than non-power switches, thus the redistribution of power from the substrate switch 116 to the power transistor switch M2 advantageously accommodates the demagnetization current $I_{demag}$ due to loss of battery power.

In an embodiment of the invention, the reverse battery protected device 200 comprises a first clamping device 138 adapted to clamp a substrate of a substrate switch 116 to a first substrate clamping voltage during reverse polarity when the magnitude of the voltage source is greater than the magnitude of the first substrate clamping voltage, and a substrate voltage adjustment device 210 adapted to clamp the substrate of the substrate switch 116 to a second substrate clamping voltage only during loss of the DC voltage source Vbat during load switching. In one embodiment, the load is an inductive load 102 or includes inductive components. In another embodiment, the magnitude of the first substrate clamping voltage is greater than the magnitude of the DC voltage source Vbat such that substrate switch 116 does not turn on during reverse polarity. In yet another embodiment, the magnitude of the second substrate clamping voltage is less than the magnitude of the first substrate clamping voltage in order to distribute power dissipation between the substrate switch 116 and a switched inductive load (e.g., inductive load 102 coupled in series with power switch M2) during loss of the DC voltage source Vbat. In another embodiment, the magnitude of the second substrate clamping voltage is less than the magnitude of the DC source voltage Vbat.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for protecting a reverse battery protected device under loss of power, the reverse battery protected device including a switched inductive load, a substrate switch coupled in parallel with the switched inductive load and a voltage source coupled in parallel with the substrate switch, the substrate switch having a semiconductor substrate and the voltage source having a voltage Vs, the method comprising:
   under reverse polarity, biasing the substrate of the substrate switch at a negative voltage −Vs, the voltage Vs of the voltage source being less than an absolute value of a first substrate clamping voltage of the substrate switch so that the substrate switch is non-conducting under reverse polarity; and
   under loss of power, clamping the substrate of the substrate switch to a second substrate clamping voltage, an absolute value of the second substrate clamping voltage being less than the absolute value of the first substrate clamping voltage for distributing power dissipation between the substrate switch and the switched inductive load.

2. The method of claim 1, wherein the switched inductive load comprises a power transistor switch coupled in series with an inductive load.

3. The method of claim 2, wherein the power transistor switch is a common-source configured MOSFET device.

4. The method of claim 2, further comprising, under loss of power, clamping a semiconductor substrate of the power transistor switch to a third substrate clamping voltage for controlling power dissipation in the power transistor switch.

5. The method of claim 4, wherein clamping the substrate of the power transistor switch to the third substrate clamping voltage triggers clamping the substrate of the substrate switch to the second substrate clamping voltage.

6. The method of claim 4, wherein the voltage Vs of the voltage source is less than an absolute value of the third substrate clamping voltage of the power transistor switch so that the substrate switch is non-conducting under reverse polarity.

7. The method of claim 1, wherein the substrate switch comprises at least two common-source configured MOSFET devices coupled in series, the at least two common-source configured MOSFET devices sharing the semiconductor substrate.

8. A method for protecting a reverse battery protected device under loss of battery during load switching, the reverse battery protected device comprising a power switch coupling a positive connector terminal to a load, and a substrate switch coupled in parallel with the power switch and the load, the reverse batter protected device operating under reverse polarity when the positive connector terminal is coupled to a negative lead of a battery and operating under load switching when the positive connector terminal is coupled to a positive lead of the battery, the battery having a voltage less than or equal to a predefined maximum battery voltage, the method comprising:
   during load switching and reverse battery polarity, selecting a most negative potential between ground and a voltage at the positive connector terminal to bias a semiconductor substrate of the substrate switch such that the substrate switch is non-conducting during reverse battery polarity, wherein an absolute value of a first substrate clamping voltage of the substrate switch is greater than the predefined maximum battery voltage; and
   during loss of battery, clamping the substrate of the substrate switch to a second substrate clamping voltage, an absolute value of the second substrate clamping voltage being less than the absolute value of the first substrate clamping voltage for distributing power dissipation between the substrate switch and the power switch.

9. The method of claim 8, wherein the load is an inductive load.

10. The method of claim 8, wherein the substrate switch comprises at least two common-source configured MOSFET devices coupled in series, the at least two common-source configured MOSFET devices sharing the semiconductor substrate.

11. The method of claim 8 further comprising, during loss of battery, clamping a semiconductor substrate of the power switch to a third substrate clamping voltage for controlling power dissipation in the power switch.

12. The method of claim 11, wherein clamping the substrate of the power switch to the third substrate clamping voltage triggers clamping the substrate of the substrate switch to the second substrate clamping voltage.

13. The method of claim 11, wherein an absolute value of the third substrate clamping voltage of the power switch is greater than the predefined maximum battery voltage.

14. A reverse battery protected device, comprising:
   a switched load having a first node coupled to a positive connector terminal and a second node coupled to a negative connector terminal, the positive connector terminal configured for coupling with a first battery terminal and the negative connector terminal configured for coupling with a second battery terminal;

a substrate switch having a semiconductor substrate, a third node coupled to the positive connector terminal and a fourth node coupled to the negative connector terminal, the substrate switch configured to bias the substrate to a most negative voltage selected between ground and battery voltage at the positive connector terminal during load switching and reverse battery, a negative battery voltage at the positive connector terminal during reverse battery being less negative than a first substrate clamping voltage of the substrate switch to prevent the substrate switch from conducting during reverse battery;

a first clamping device coupled to the substrate switch, the first clamping device configured to clamp the substrate of the substrate switch to the first substrate clamping voltage during reverse battery when the negative battery voltage at the positive connector terminal is more negative than the first substrate clamping voltage; and a substrate voltage adjustment device coupled to the substrate switch, the substrate voltage adjustment device configured to clamp the substrate of the substrate switch to a second substrate clamping voltage that is less negative than the first substrate clamping voltage during loss of battery voltage at the positive connector terminal during load switching.

15. The reverse battery protected device of claim 14, wherein the first clamping device comprises a Zener diode coupled in series with a diode.

16. The reverse battery protected device of claim 14, wherein the switched load comprises a power transistor switch coupled in series with an inductive load, the power transistor switch having a semiconductor substrate.

17. The reverse battery protected device of claim 16, further comprising a second clamping device coupled to the power transistor switch and the substrate voltage adjustment device, the second clamping device configured to clamp the substrate of the power transistor switch during loss of battery voltage at the positive connector terminal during load switching.

18. The reverse battery protected device of claim 17, wherein the substrate voltage adjustment device is configured to clamp the substrate of the substrate switch to the second substrate clamping voltage when the second clamping device clamps the substrate of the power transistor switch during loss of battery voltage at the positive connector terminal during load switching.

19. The reverse battery protected device of claim 17, wherein the substrate switch comprises a first MOSFET switch and a second MOSFET switch, a drain of the first MOSFET switch coupled to the third node, a source of the first MOSFET switch coupled to a source of the second MOSFET switch, a drain of the second MOSFET switch coupled to the fourth node, a gate of the first MOSFET switch coupled to the negative connector terminal and a gate of the second MOSFET switch coupled to the positive connector terminal.

20. The reverse battery protected device of claim 19, wherein the first and second MOSFET switches are common-source configured MOSFET switches that share the semiconductor substrate.

21. The reverse battery protected device of claim 19, wherein the substrate voltage adjustment device comprises a MOS mirror device and a diode, the MOS mirror device coupled to the second clamping device and the diode coupled to the MOS mirror device and the gate of the second MOSFET switch, the MOS mirror device configured to forward bias the diode upon activation of the second clamping device during loss of battery voltage, a current in the forward biased diode used for raising a voltage on the gate of the second MOSFET switch for clamping the substrate of the substrate switch to the second substrate clamping voltage.

22. The reverse battery protected device of claim 17, wherein the second clamping device comprises a Zener diode coupled in series with a diode.

23. The reverse battery protected device of claim 16, wherein the power transistor switch is a power MOSFET switch having a gate, a drain coupled to the positive connector terminal and a source coupled to the inductive load.

24. A circuit protection system for use with an inductive load and a DC voltage source, the circuit protection system comprising:

a substrate switch having a semiconductor substrate, a first node coupled to a first terminal of the DC voltage source and to the inductive load and a second node coupled to a second terminal of the DC voltage source, the substrate switch configured to bias the substrate to a most negative voltage selected between ground and a voltage at the first node during inductive load switching and reverse polarity;

a first clamping device coupled to the substrate switch, the first clamping device configured to clamp the substrate at a first substrate clamping voltage during reverse polarity when a negative battery voltage at the first node is more negative than the first substrate clamping voltage; and a substrate voltage adjustment device coupled to the substrate switch, the substrate voltage adjustment device configured to clamp the substrate at a second substrate clamping voltage that is less negative than the first substrate clamping voltage during a decoupling of the first node from the first terminal of the DC voltage source or a decoupling of the second node from the second terminal of the DC voltage source.

25. A system configured for protecting a reverse battery protected device under loss of power, the reverse battery protected device including a switched inductive load, a substrate switch coupled in parallel with the switched inductive load and a voltage source coupled in parallel with the substrate switch, the substrate switch having a semiconductor substrate and the voltage source having a voltage Vs, the system comprising:

under reverse polarity, means for biasing the substrate of the substrate switch at a negative voltage −Vs, the voltage Vs of the voltage source being less than an absolute value of a first substrate clamping voltage of the substrate switch so that the substrate switch is non-conducting under reverse polarity; and under loss of power, means for clamping the substrate of the substrate switch to a second substrate clamping voltage, an absolute value of the second substrate clamping voltage being less than the absolute value of the first substrate clamping voltage for distributing power dissipation between the substrate switch and the switched inductive load.

* * * * *